US008666042B2

(12) United States Patent
Wu et al.

(10) Patent No.: US 8,666,042 B2
(45) Date of Patent: Mar. 4, 2014

(54) TECHNIQUES FOR PERFORMING KEY FRAME REQUESTS IN MEDIA SERVERS AND ENDPOINT DEVICES

(75) Inventors: Duanpei Wu, San Jose, CA (US); Kavitha Velusamy, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 191 days.

(21) Appl. No.: 13/287,155

(22) Filed: Nov. 2, 2011

(65) Prior Publication Data

US 2013/0106984 A1      May 2, 2013

(51) Int. Cl.
    *H04M 11/00*    (2006.01)
(52) U.S. Cl.
    USPC .................................. 379/93.21; 348/14.12
(58) Field of Classification Search
    USPC .......... 348/14.01, 14.08, 14.09, 14.12, 14.15;
                          379/93.21, 158, 202.01, 204.01
    See application file for complete search history.

(56) References Cited

U.S. PATENT DOCUMENTS

| 7,084,898 B1 | 8/2006 | Firestone et al. |
| 7,672,373 B2 | 3/2010 | Toebes et al. |
| 2005/0078170 A1 | 4/2005 | Firestone et al. |
| 2007/0294346 A1* | 12/2007 | Moore et al. .................. 709/204 |
| 2008/0100694 A1* | 5/2008 | Barkley et al. ............. 348/14.08 |
| 2011/0310217 A1* | 12/2011 | Lee et al. ................... 348/14.08 |

* cited by examiner

*Primary Examiner* — Olisa Anwah
(74) *Attorney, Agent, or Firm* — Edell, Shapiro & Finnan, LLC

(57) ABSTRACT

Techniques are provided for sending and receiving key frames and key frame request messages. At a video conference bridge, a key frame request message is received from a first endpoint device. The key frame request message comprises a request for a key frame from a second endpoint device. When a prior key frame request message is received before the key frame request message, a key frame request time value is determined that corresponds to an amount of time between receiving the key frame request message and receiving the prior key frame request message. This value is compared to a threshold time value. When the key frame request time is greater than the threshold time, a key frame request forwarding message is generated, and the key frame request forwarding message is sent to the second endpoint device to request the key frame from the second endpoint device.

21 Claims, 7 Drawing Sheets

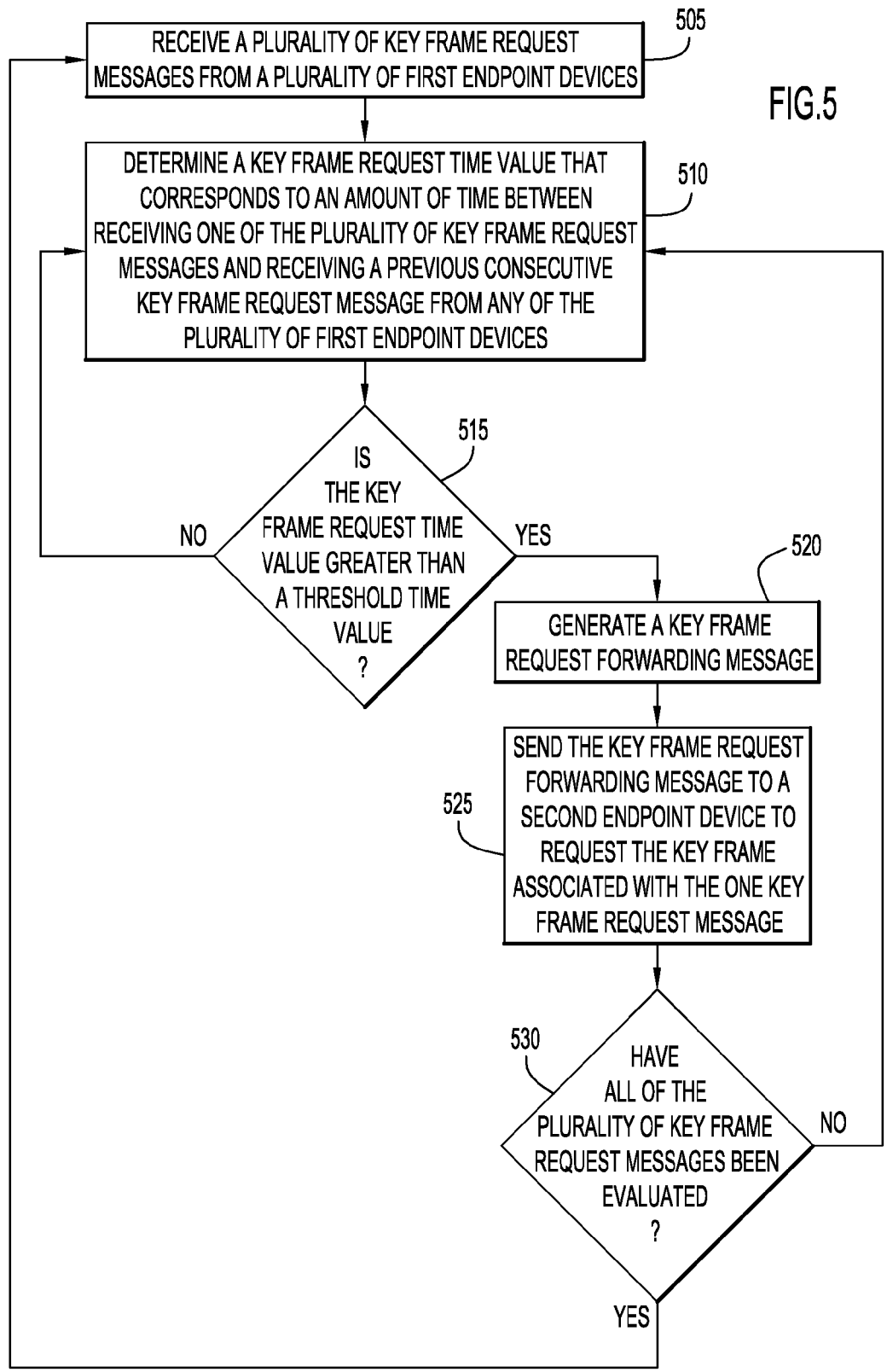

ns to determine
TECHNIQUES FOR PERFORMING KEY FRAME REQUESTS IN MEDIA SERVERS AND ENDPOINT DEVICES

TECHNICAL FIELD

The present disclosure relates to video conference management and video stream frame exchanges.

BACKGROUND

Key frame requests are functions in point-to-point and server-to-point bidirectional video communications. Key frame requests provide a means to recover video decoding from a broken bit-stream flow due to network packet loss or corruption. A key frame request is sent from an endpoint or server to a remote endpoint or server. In response, the remote endpoint or server sends the key frame back to the requesting device. The key frame request can serve as a re-synchronizing point for the requesting endpoint or server to continue to decode the bit stream.

BRIEF DESCRIPTION OF THE DRAWINGS

FIG. 5 is a flow chart depicting operations for determining whether to forward key frame request messages that are received from multiple endpoint devices, each requesting a key frame from another endpoint device.

DESCRIPTION OF EXAMPLE EMBODIMENTS

Overview

Techniques are provided for sending and receiving key frames and key frame request messages and to manage thresholds values to achieve system functions. At a video conference bridge, a key frame request message is received from a first endpoint device participating in a video conference, wherein the key frame request message comprises a request for a key frame from a second endpoint device participating in the video conference. When a prior key frame request message is received before the key frame request message, a key frame request time value is determined that corresponds to an amount of time between receiving the key frame request message and receiving a prior key frame request message from the first endpoint device. The key frame request time value is compared to a threshold time value, and a key frame request forwarding message is generated when the key frame request time is greater than the threshold time. The key frame request forwarding message is sent to the second endpoint device to request the key frame from the second device when the key frame request time is greater than the threshold time value.

Example Embodiments

Figure 1:
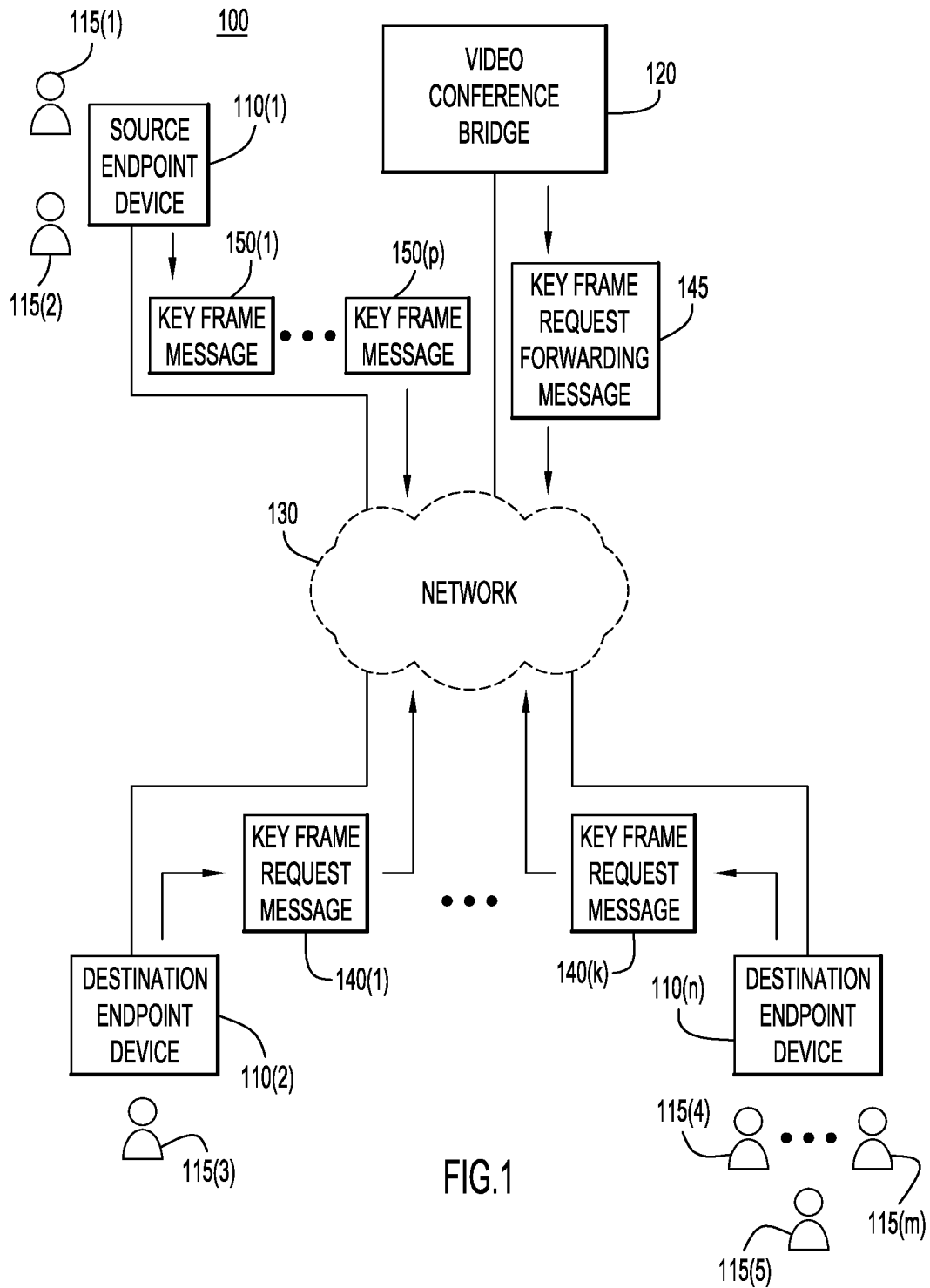
FIG. 1 shows an example audio/video network environment featuring a plurality of audio/video endpoint devices and an audio/video conference bridge apparatus that is configured to detect key frame requests from the audio/video endpoint devices and to forward the requests to appropriate endpoint devices.

FIG. 1 shows an example audio/video network environment 100 with a plurality of audio/video endpoint devices and an audio/video conference bridge apparatus. The audio/video endpoint devices (herein "endpoint devices") are shown at reference numerals 110(1)-110(n), and the audio/video conference bridge apparatus (herein "video conference bridge") is shown at reference numeral 120. The endpoint devices 110(1)-110(n) communicate with the video conference bridge 120 via a network 130 in order to send and receive audio and video messages (i.e. video streams) within the audio/video network environment 100.

Each of the endpoint devices 110(1)-110(n) may service a plurality of participants. The participants are shown in FIG. 1 at reference numerals 115(1)-115(m) at various ones of the endpoint devices 110(1)-110(n). The participants 115(1)-115(m) may be human or automated participants of an audio/video conference, and during the course of the conference session, the participants 115(1)-115(m) communicate with one another via their respective endpoint devices 110(1)-110(n). It should be appreciated that the audio/video network environment 100 may contain any number of endpoint devices and that any number of participants may be located at each of the endpoint devices 110(1)-110(n).

In general, the endpoint devices 110(1)-110(n) may be any device that is configured to capture, send and receive audio and video data (herein "video streams"), for example, of the participants 115(1)-115(m) and of other material presented during the conference, such as documents, images, videos, etc. The endpoint devices 110(1)-110(n) are also configured to display the video streams to the participants 115(1)-115(m). For example, the endpoint devices 110(1)-110(n) may be any audio/video teleconference video device, web camera or video enabled laptop device, mobile device, tablet, computer, etc. Likewise, the video conference bridge 120 may be any device that is configured to send and receive the video streams to and from one or more of the endpoint devices 110(1)-110(n). Additionally, the video conference bridge 120 may be any device that is configured to receive request messages (e.g., key frame messages and key frame request messages) from one or more of the endpoint devices 110(1)-110(n) and may forward these request messages to appropriate ones of the endpoint devices 110(1)-110(n), as described herein.

The endpoint devices 110(1)-110(n) may send and receive the video streams to and from the video conference bridge 120 to enable the participants 115(1)-115(m) to communicate with one another via the endpoint devices 110(1)-110(n). In one example, as shown in FIG. 1, the endpoint device 110(1) is a "source" endpoint device that is configured to send a video stream of participants 115(1) and 115(2) to the video conference bridge 120, while endpoint devices 110(2)-110(n) are shown as "destination" endpoint devices that are configured to receive the video stream of participants 115(1) and 115(2), originating from the source endpoint 110(1), from the video conference bridge 120. It should be appreciated, however, that the destination endpoint devices 110(2)-110(n) may operate as source endpoint devices to send video streams of respective participants 115(3) and 115(4)-115(m) to the video conference bridge 120. Likewise, it should be appreciated that the source endpoint device 110(1) may operate as a destination endpoint device to receive these video streams from the video conference bridge 120. For simplicity, endpoint device 110(1) is shown as the source endpoint device, and endpoint devices 110(2)-110(n) are shown as the destination endpoint devices.

As described herein, when video streams are sent from the source endpoint device 110(1) to the video conference bridge 120 (for ultimate transmission to intended destination endpoint devices 110(2)-110(n)), certain portions of the video stream may become lost or corrupted. For example, packets of the video stream may be lost or corrupted during the video stream transmission. This may result in the destination endpoint devices 110(2)-110(n) receiving a corrupted or broken bit video stream (originating from the source endpoint device 110(1)) from the video conference bridge 120. In response, the destination endpoint devices 110(2)-110(n) may query the video conference bridge 120 to request certain messages from the source endpoint device 110(1) to rectify or correct the corrupted or broken video stream that was received.

For example, as shown in FIG. 1, the destination endpoints 110(2)-110(n), in response to receiving a corrupted video stream from the video conference bridge 120 (originating from the source endpoint 110(1)), may send key frame request messages 140(1)-140(k) to the video conference bridge 120 via the network 130. The key frame request messages 140(1)-140(k) may be requests for particular key frames messages associated with the video stream sent by the source endpoint device 110(1). It should be appreciated that each of the key frame request messages 140(1)-140(k) may be a request for different or similar key frame messages associated with the video stream sent by the source endpoint device 110(1). In other words, different ones of the destination endpoint devices 110(2)-110(n) may request different key frames from the source endpoint device 110(1) in order to correct the corrupted video stream. Moreover, different ones of the destination endpoint devices 110(2)-110(n) may request the same key frame from the source endpoint device 110(1).

The video conference bridge 120 receives the key frame request messages 140(1)-140(k) and, according to the techniques described herein, evaluates characteristics of the key frame request messages 140(1)-140(k) to determine whether or not to send a key frame request forwarding message 145 to the source endpoint device 110(1). The key frame request forwarding message 145 operates to forward the request for the particular key frame(s) to the source endpoint device 110(1), as described herein. In response to receiving the key frame request forwarding message 145, the source endpoint device 110(1) sends appropriate key frame messages 150(1)-150(p) to the video conference bridge 120, via the network 130, for ultimate delivery to the appropriate destination endpoint devices 110(2).

Figure 2:
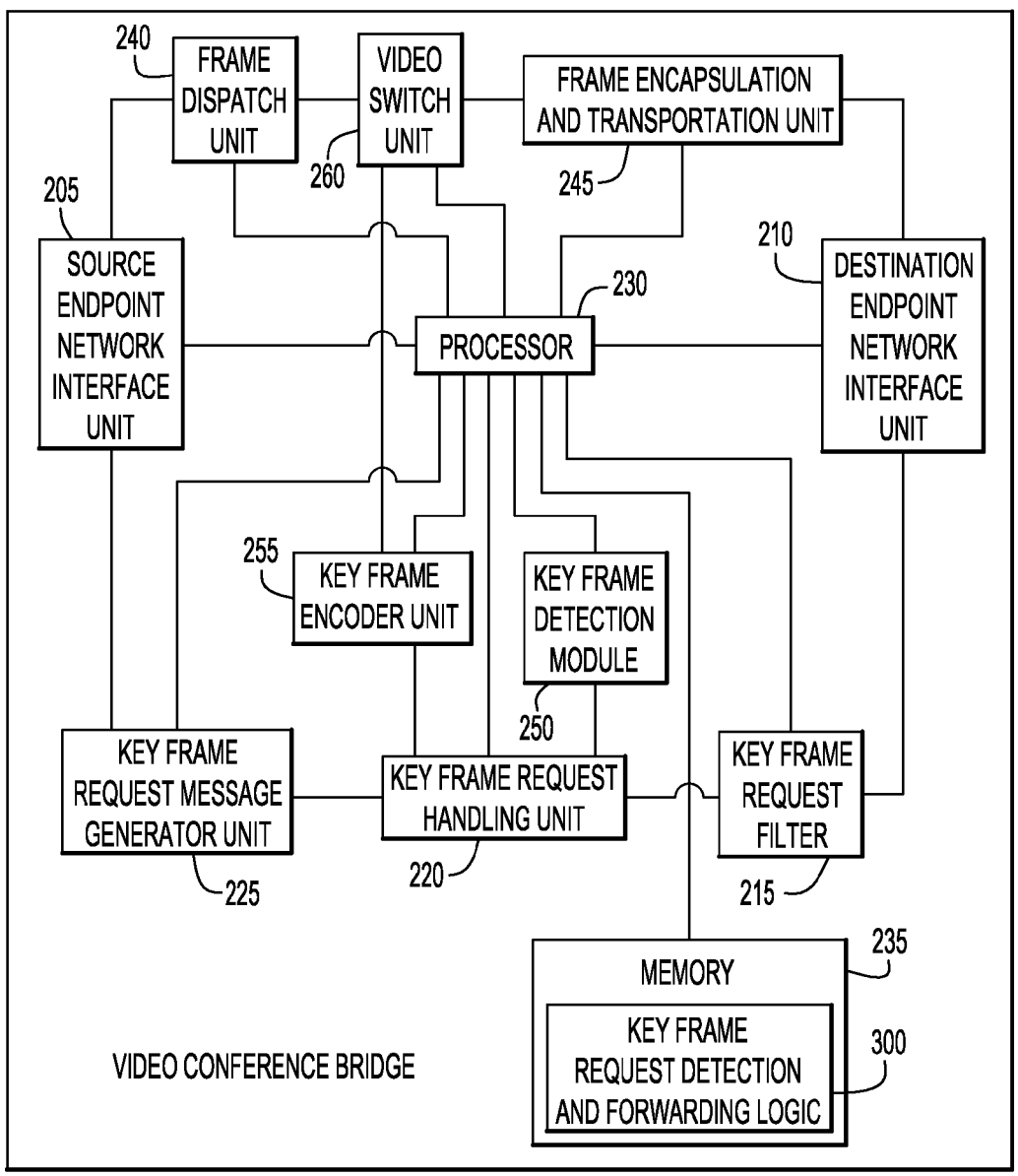
FIG. 2 is an example of a block diagram of the audio/video conference bridge apparatus configured to send key frame request messages to and receive key frame request messages from corresponding endpoint devices.

Reference is now made to FIG. 2. FIG. 2 shows an example block diagram of the video conference bridge 120. The video conference bridge 120 comprises a source endpoint network interface unit 205, a destination endpoint network interface unit 210, a key frame request filter 215, a key frame request handling unit 220, a key frame request message generator unit 225, a processor 230 and a memory 235. The key frame request filter 215, key frame request handing unit 220, key frame request message generator unit 225, processor 230 and memory 235 are used in performing the techniques described herein, and these components are now described. The key frame request filter 215, key frame request handing unit 220 and key frame request message generator unit 225 maybe embodied as application specific integrated circuits or implemented in software executed by processor 230 or by separate processors.

The source endpoint network interface unit 205 is coupled to the key frame request message generator 225, the processor 230 and a frame dispatcher unit 240. The source endpoint network interface unit 205 is configured to receive messages (e.g., key frame messages 150(1)-150(p)) originating from the source endpoint device 110(1) via the network 130. In general, the source endpoint network interface unit 205 is a network interface device, e.g., Ethernet card, configured to send and receive messages over a network. To this end, it may receive any type of video frames of a video stream. For example, the source endpoint network interface unit 205 may receive video frames such as intra-coded frames or "I-frames" (e.g., key frames), predicted frames or "P-frames," and bi-directional predicted frames or "B-frames." The source endpoint network interface unit 205 is also configured to send the key frame request messages 140(1)-140(k), originating from one or more of the destination endpoint devices 110(2)-110(n), to the source endpoint device 110(1) via the network 130.

The destination endpoint network interface unit 210 is coupled to the key frame request filter 215, the processor 230 and a frame encapsulation and transportation unit 245. The destination endpoint network interface unit 210 is also an Ethernet card, for example, and is configured to receive the key request messages 140(1)-140(k) from one or more of the destination endpoint devices 110(2)-110(n) via the network 130 and to send video frames, and in particular the key frame messages 150(1)-150(p), originating from the source endpoint device 110(1), to the destination endpoint devices 110 (2)-110(n) via the network 130.

As stated above, the key frame request filter 215 is coupled to the destination endpoint network interface unit 210 and is also coupled to the processor 230 and to the key frame request handing unit 220. The key frame request filter 215 is configured to implement the key frame request message filtering techniques, described herein, to reduce the key frame message requesting rate.

In addition to being coupled to the key frame request filter 215, the key frame request handling unit 220 is coupled to the key frame request message generator unit 225, the processor 230, a key frame detection module 250 and a key frame encoder unit 255. The key frame request handling unit 220 is configured to implement a key frame request and response procedure. In general, the key frame request handling unit 220 receives the key frame request messages 140(1)-140(k) (originating from the destination endpoint devices 110(2)-110(n)) from the key frame request filter 215 and also receives the key frame messages 150(1)-150(p) (originating from the source endpoint device 110(1)) that is detected by the key frame detection module 245.

Depending on the key frame handling techniques, the key frame request handling unit 220 is configured to inform the key frame request message generator unit 225 (which is coupled to the source endpoint network interface unit 205, the processor 230 and the key frame request handling unit 220) to generate the key frame request forwarding message 145, which is of a format that will be recognized by the source endpoint device 110(1). In one embodiment, where the video conference bride 120 stores all of the video stream data received by each endpoint device 110(1)-110(n), the key frame request handing unit 220 instructs the key frame encoder unit 255 to generate the key frame messages 150(1)-150(p) associated with the received key frame request messages 140(1)-140(k).

The processor 230 is coupled to every component shown in FIG. 2. The processor 230 is, for example, a microprocessor or microcontroller that is configured to execute program logic instructions for carrying out various operations and tasks described herein. For example, the processor 230 can execute key frame request detection and forwarding logic 300 stored in memory 235 in order to receive key frame request messages and to send key frames to appropriate ones of the endpoint devices 110(1)-110(n). The memory 235 may comprise read only memory (ROM), random access memory (RAM), magnetic storage media, optical storage media, flash memory, electrical, or other physical/tangible (non-transitory) memory.

The functions of processor 230 may be implemented by logic encoded in one or more tangible computer readable media (e.g., embedded logic such as an application specific integrated circuit, digital signal processor instructions, software that is executed by a processor, etc.) wherein memory 235 stores data used for the operations described herein and stores software or processor executable instructions that are executed to carry out the operations described herein.

The key frame request detection and forwarding logic 300 may take any of a variety of forms, so as to be encoded in one or more tangible computer readable memory media or storage device (e.g., memory 235) for execution, such as fixed logic or programmable logic (e.g., software/computer instructions executed by a processor). In some embodiments, the processor 230 is an application specific integrated circuit (ASIC) that includes fixed digital logic, programmable logic, or a combination thereof. For example, the processor 230 may be embodied in digital logic gates in a fixed or programmable digital logic integrated circuit, where the digital logic gates are configured to perform instructions of the key frame request detection and forwarding logic 300. In another form, the key frame request detection and forwarding logic 300 may be embodied in one or more tangible computer readable storage media encoded with software comprising computer executable instructions that when executed are operable to perform the operations described herein for the process logic 300.

Other components of the video conference bridge 120 include the frame dispatch unit 240, the frame encapsulation and transportation unit 245, the key frame detection module 250, the key frame encoder unit 255 and a video switch 260. The frame dispatcher unit 240 is coupled to the source endpoint network interface unit 205, the processor 230 and the video switch unit 260. The frame encapsulation and transportation unit 245 is coupled to the destination endpoint network interface unit 210, the processor 230 and the video switch 260. The key frame detection module 250 is coupled to the key frame request handling unit 220 and the processor 230. The key frame encoder unit 255 is coupled to the key frame request handing unit 220, the processor 230 and the video switch unit 260. The frame dispatch unit 240, frame encapsulation and transportation unit 245, key frame detection module 250, key frame encoder unit 255 and video switch 260 maybe embodied as application specific integrated circuits or implemented in software executed by processor 230 or by separate processors. In general, the components of the video conference bridge 120 may be software components, hardware components or a combination of software and hardware components.

Finally, the video switch unit 260 is coupled to the processor 230, the frame dispatcher unit 240, the frame encapsulation and transportation unit 245 and the key frame encoder unit 255. The video switch unit 260 enables the video conference bridge 120 to pass video streams from the source endpoint device 110(1) to the destination endpoints 110(2)-110(n) via the frame dispatcher unit 240 and the frame encapsulation and transportation unit 245. For voice-activated video switch conferences, the source endpoint device is usually the endpoint device with the loudest participant or current active speaker. When the loudest participant or current active participant switches, the video stream from the current active participant will switch accordingly (thus, switching the source endpoint device 110(1) to operate as a destination endpoint device 110(2) and switching the destination endpoint device with the loudest/current active speaker to operate as the source endpoint device).

As a video stream is sent from the source endpoint device 110(1) to the plurality of destination endpoint devices 110(2)-110(n), packets or portions of the video stream may be lost or corrupted, which result in the destination endpoint devices 110(2)-110(n) receiving an incomplete or broken video stream. When the destination endpoint devices 110(2)-110(n) receive a broken video stream from the video conference bridge 120 (originating from the source endpoint device 110(1)), the destination endpoint devices 110(2)-110(n) may request certain video frames from the source endpoint device 110(1) to rectify the broken video stream. Accordingly, as described herein, the destination endpoint devices 110(2)-110(n) may request certain key frames from the source endpoint device 110(1), though it should be appreciated that these techniques may be applied to any requested video streams (such as the P-frames or B-frames, described above).

In general, key frames are frames of a video stream that define particular starting and ending points (e.g., starting time and ending time) associated with a segment of a video stream. Key frames serve as re-synchronizing points for a video stream. A video stream may have several key frames, and consecutive key frames indicate consecutive time instances or points for the video segment. For example, a video stream may contain a segment that comprises a car moving in front of a building. A first key frame of this segment may contain data that indicates a first time instance of the video stream segment, e.g., a "snapshot" image of the car at a starting time one second into the video segment, and a (second) consecutive key frame may contain data that indicates a second time instance of the video stream segment, e.g., a "snapshot" image of the car three seconds into the video segment. A (third) consecutive key frame may contain data that indicates a third time instance of the video stream segment, e.g., a "snapshot" image of the car at a second stopping time five second into the video segment.

Thus, in the above example, the three consecutive key frames would show the car at various locations in front of the building at one second, three seconds and five seconds into the video segment. Upon receiving the three consecutive key frames, the audio/video equipment such as the endpoint devices 110(1)-110(n) may be able to interpolate or "fill-in" the motion between the key frames to replicate the video image. That is, in the above example, when the endpoint devices receive the three key frames, the endpoint devices may be able to "fill-in" the motion of the car between the key frame time instances. Thus, the endpoint devices may be able to compile a video by inserting interpolated video data in between the received key frames to produce the video segment.

In an audio/video conference such as one supported by the audio/video network environment 100 in FIG. 1, the destination endpoint devices 110(2)-110(n) can request key frames from the source endpoint device 110(1) to correct broken video streams. However, typical key frame request techniques may be problematic due to the large memory sizes associated with key frames. Key frames are relatively large files (i.e. large memory files) in comparison to other video frames, such as P-frames and B-frames. The audio/video network environment 100 may have strict bandwidth allowance requirements, and frequent key frame transfers could result in elevated bit rates, which may bring the audio/video network environment 100 close to the bandwidth limit. This may result in poor video quality for the video streams received by the destination endpoint devices 110(2)-110(n), which would result in even more key frame requests.

Additionally, in an effort to correct the broken video stream, the destination endpoint devices 110(2)-110(n) may send multiple key frame requests, close in time, to the video conference bridge 120. This may result in redundant key frames being sent from the source endpoint device 110(1) to the destination endpoint devices 110(2)-110(n). The techniques described herein alleviate these problems by providing a controlled approach to sending and receiving key frames and key frame request messages.

Figure 3:
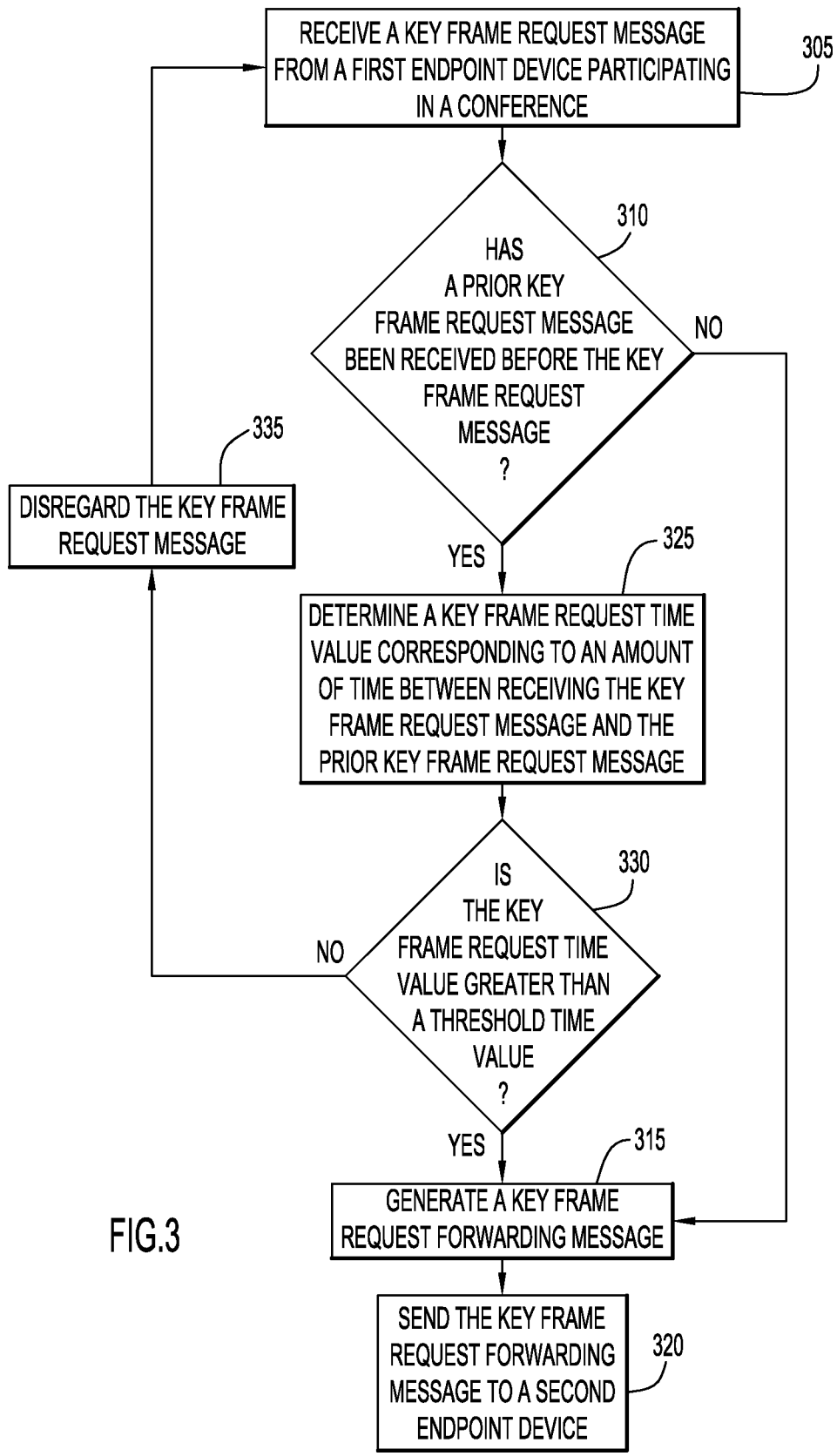
FIG. 3 is a flow chart depicting operations to determine whether to forward a key frame request message that is received from one endpoint device requesting a key frame from another endpoint device.

Reference is now made to FIG. 3, which shows a flow chart depicting operations of the key frame request detection and forwarding logic 300 to determine whether to forward a key frame request message received from one of the destination endpoint devices 110(2)-110(n). At operation 305, the video conference bridge 120 receives, via the network 130, a key frame request message from a first endpoint device participating in a conference. The key frame request message may be one of the key frame request messages 140(1)-140(k) shown in FIG. 1, and the first endpoint device may be one of the destination endpoint devices 110(2)-110(n) shown in FIG. 1. After receiving the key frame request message, the processor 230 of the video conference bridge 120 determines whether a prior key frame request message has been received before the received key frame request message. If a prior key frame message has not been received, the processor 230, at 315, generates the key frame request forwarding message 145 and at 320, sends the key frame request forwarding message 145 to a second endpoint device in order to obtain the key frame(s) associated with the request. The second endpoint device may be, for example, the source endpoint device 110 (1).

If a prior key frame request message has been received (i.e., if the answer to decision 310 is "yes"), the processor 230 determines, at 325, a key frame request time value corresponding to an amount of time between receiving the key frame request message and receiving the prior key frame request message. At 330, the processor 230 determines whether the key frame request time value is greater than a threshold time value. The threshold time value may correspond to a sufficient time window that ensures that received key frame request messages are not redundant and that key frames sent in response to received key frame request messages will not exceed bandwidth limits of the audio/video network environment 100.

If the key frame request time value is greater than the threshold time value, the processor 230 classifies the received key frame request message as a valid key frame request message and, at 315, generates the key frame request forwarding message 145. The key frame request forwarding message 145 is of a format that will be recognized by the source endpoint device 110(1) and may contain information comprising the particular key frame requested by the one or more destination endpoint devices 110(2)-110(n). Additionally, the key frame request message 145 may contain information comprising address and identity information associated with the particular destination endpoint device(s) making the key frame request. At 320, the processor 230 sends the key frame request forwarding message 145 to the second endpoint device (e.g., the source endpoint device 110(1)).

If the key frame request time value is not greater than the threshold time value (i.e., if the answer to operation 330 is "no"), the processor 230 of the video conference bridge 120 classifies the key frame request as an invalid key frame request message, at 335, disregards the key frame request message and reverts back to operation 305.

Figure 4:
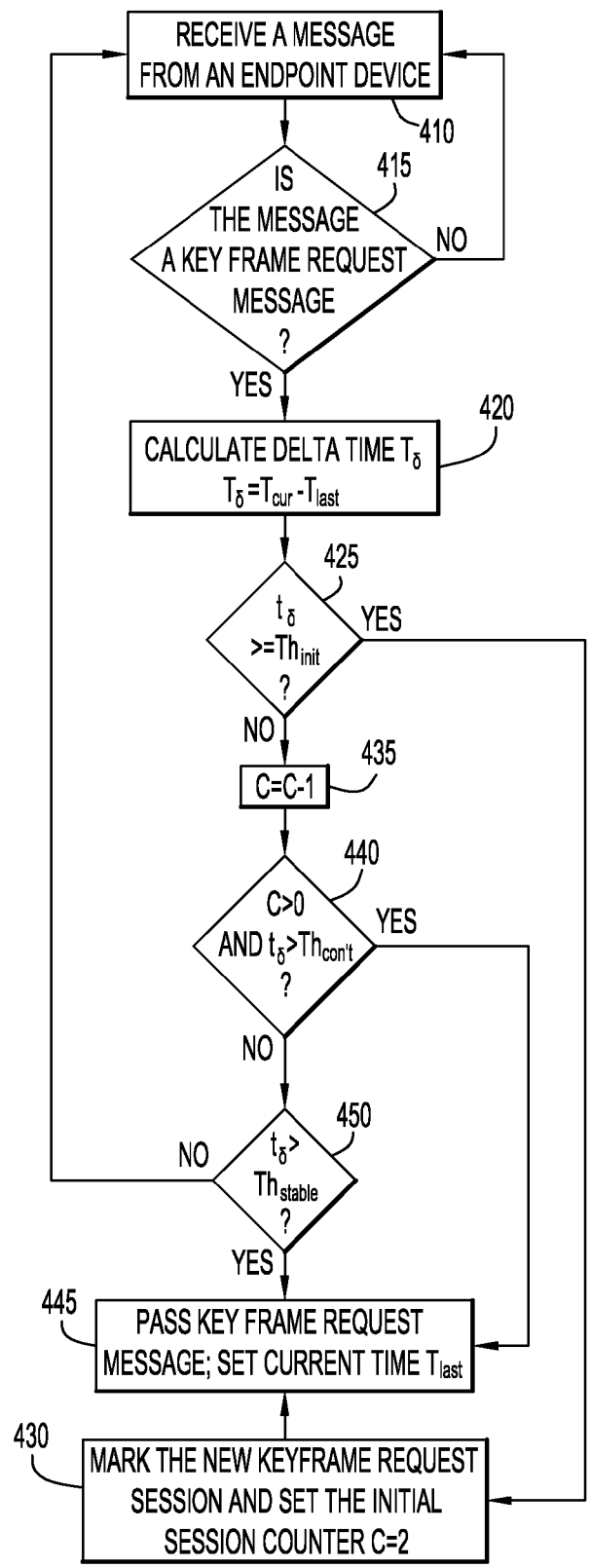
FIG. 4 is a flow chart depicting operations for filtering key frame message requests received by the audio/video conference bridge apparatus from one of the endpoints to determine validity of received key frame request messages.

Reference is now made to FIG. 4. FIG. 4 shows a flow chart depicting operations of the key frame request detection and forwarding logic 300 to filter a key frame message request received by the video conference bridge 120 from one of the destination endpoint devices 110(2)-110(n) to determine the validity of the received key frame request message. Table 1 comprises definitions are used in connection with the operations described in FIG. 4:

TABLE 1

Definitions used in connection with filtering a key frame message request

| Variable | Definition |
| --- | --- |
| $TH_{init}$ | Time threshold of the first key frame request message to set up initiation key frame request session (default value = four seconds) |
| $TH_{cont}$ | Time threshold of the subsequent key frame request messages (default value = 300 milliseconds) |
| $TH_{stable}$ | Time threshold of other key frame request messages (default value = two seconds) |
| $TH_{cur}$ | The current system time from zero |
| $TH_{last}$ | The system time when the last keyframe request message was honored. Initial value = $-TH_{init}$ | where $TH_{init} > TH_{stable} > TH_{cont}$.

At operation 410, the processor 230 of the video conference bridge 120 receives a message from a first endpoint device (e.g., a destination endpoint device).

At 415, the processor 230 confirms whether the received message is a key frame request message (e.g., key frame request message 140(1)). If the received message is not a key frame request message, the processor 230 reverts to step 410. If the received message is a key frame request message, the processor 230, at 420 calculates a delta time, (shown as "$T_\delta$") associated with the received key frame request message 140 (1). The delta time is calculated by determining the time at which the key frame request message 140(1) was received (i.e., the "current" time, $T_{cur}$), the time at which the last key frame request message was received (i.e., the "last" time, $T_{last}$) and subtracting the "last" time from the "current" time. If the received key frame message 140(1) is the first received key frame message, the "last" time is given an initial value, which may correspond to a negative value of an "initial threshold" time value ($Th_{init}$), as described below.

After calculating the "delta" time, the processor 230 compares the delta time to the "initial threshold" time value. The "initial threshold" time corresponds to an initial threshold time value that will be used to determine whether the received key frame request message 140(1) should be sent to the source endpoint device 110(1). If the "delta" time is greater than or equal to the "initial threshold" time value, then, at 430, the processor 230 generates a session counter value, C, and sets it to an initial value (e.g., C=2). It should be appreciated that since the "last" time value is initially set as the negative value of the "initial threshold" time, the delta time of the first received key request message will always be greater than the "initial threshold" time value. After operation 430, the processor 230, at 445, will pass the key frame request message (e.g., the processor 230 will generate the key frame request forwarding message 145) and will send the key frame request forwarding message 145 to source endpoint device 110(1). Additionally, at 445, the processor 230 will set the "last" time value to a same time value as the "current" time value.

If the "delta" time value for the received key frame request message 140(1) is not greater than the "initiation threshold" time (e.g., if the received key frame request message 140(1) is not the first received key frame request message or if the received key frame request message 140(1) was received too soon after the previously received key frame request message), the processor 230, at 435, will decrement the session counter value. At 440, the processor 230 will determine whether the session counter value is a positive number and whether the "delta" time value is greater than a "continuation" time threshold value, $Th_{cont'd}$. The "continuation" time threshold value is a threshold value that is set to allow follow-up key frame request messages to be sent to the source endpoint device 110(1).

If the session counter is a positive number and if the "delta" time value is greater than the "continuation" time value, the processor 230 reverts to operation 445. If the session counter is not a positive number or if the "delta" time value is less than the "continuation" time value, the processor 230, at 450, compares the "delta" time value to a "stable" time value, $Th_{stable}$. The "stable" time value is a time threshold value that is set for other key frame request messages. If the "delta" time value is less than the "stable" time value, the processor reverts to operation 445. If the "delta" time value is greater than the "stable" time value, the processor reverts to operation 410 to receive a message from an endpoint device.

Reference is now made to FIG. 5. FIG. 5 shows a flow chart depicting operations of the key frame request detection and forwarding logic 300 to determine whether to forward key frame request messages 140(1)-140(k) that are received from multiple destination endpoint devices 110(2)-110(n). At operation 405, the video conference bridge 120 receives a plurality of key frame request messages from a plurality of first endpoint devices. The plurality of first endpoint devices are, for example, the destination endpoint devices 110(2)-110(n), and the plurality of key frame request messages are the key frame request messages 140(1)-140(k).

At 510, processor 230 of the video conference bridge 120 determines a key frame request time value that corresponds to an amount of time between receiving one of the plurality of key frame request messages and receiving a previous consecutive key frame request message from any of the plurality of endpoint devices 110(2)-110(n). At 515, the processor 230 determines whether the key frame request time value is greater than a threshold time value. The threshold time value may be configured in a manner similar to that described in connection with FIG. 3, above.

If the key frame request time value is not greater than the threshold time value (i.e., if the answer to operation 415 is "no"), the processor classifies the corresponding key frame request message as invalid and reverts to operation 510. If the key frame request time value is greater than the threshold time value (i.e., if the answer to operation 415 is "yes"), the processor 230 classifies the corresponding key frame request messages as valid and generates, at 520, the key frame request forwarding message 145. At 525, the processor 230 sends the key frame request forwarding message 145 to a second endpoint device (e.g., the source endpoint device 110(1)) to request the key frame associated with the one key frame request message. After sending the key frame request forwarding message 145, the processor 230, at 530, determines whether all of the plurality of received key frame request messages have been evaluated (e.g., if key frame request time values for all of the key frame request messages have been compared to the threshold time value). If so, the processor 230 reverts to operation 505 to detect other key frame request messages. If all of the plurality of received key frame request messages have not been evaluated, the processor 230 reverts to operation 510 in order to perform operations 510, 515, 520 and 525 on the remaining received key frame request messages.

Figure 6A:
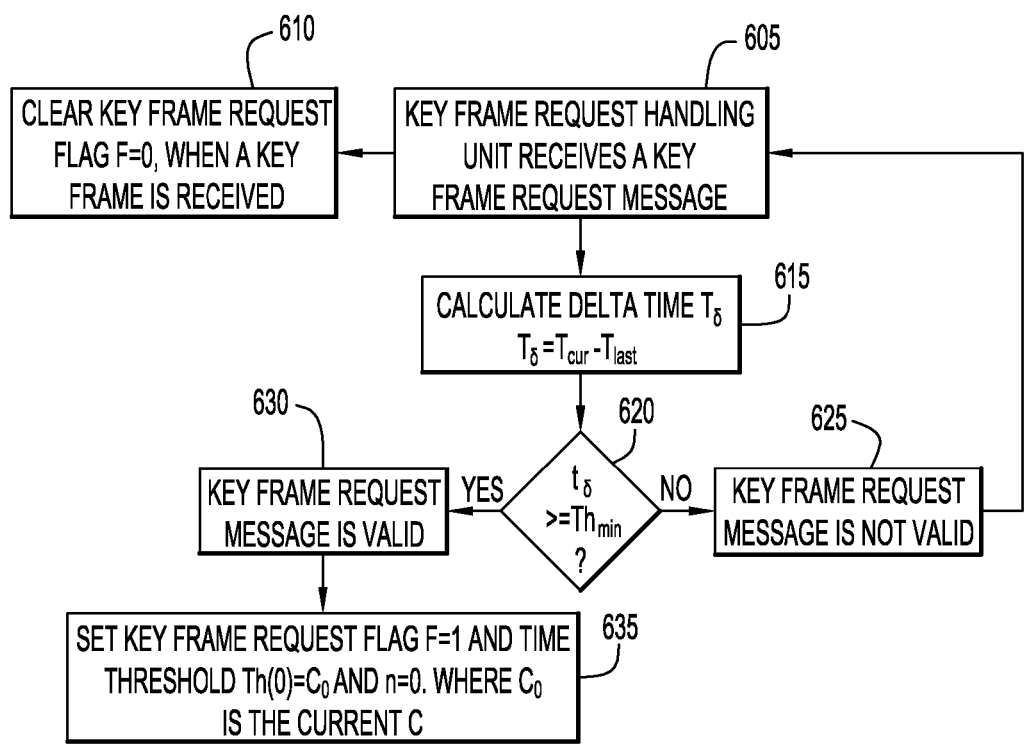
FIGS. 6A and 6B are flow charts depicting operations for filtering key frame message requests received by the audio/video conference bridge apparatus from multiple endpoints to determine the validity of each received key frame request message.
Figure 6B:
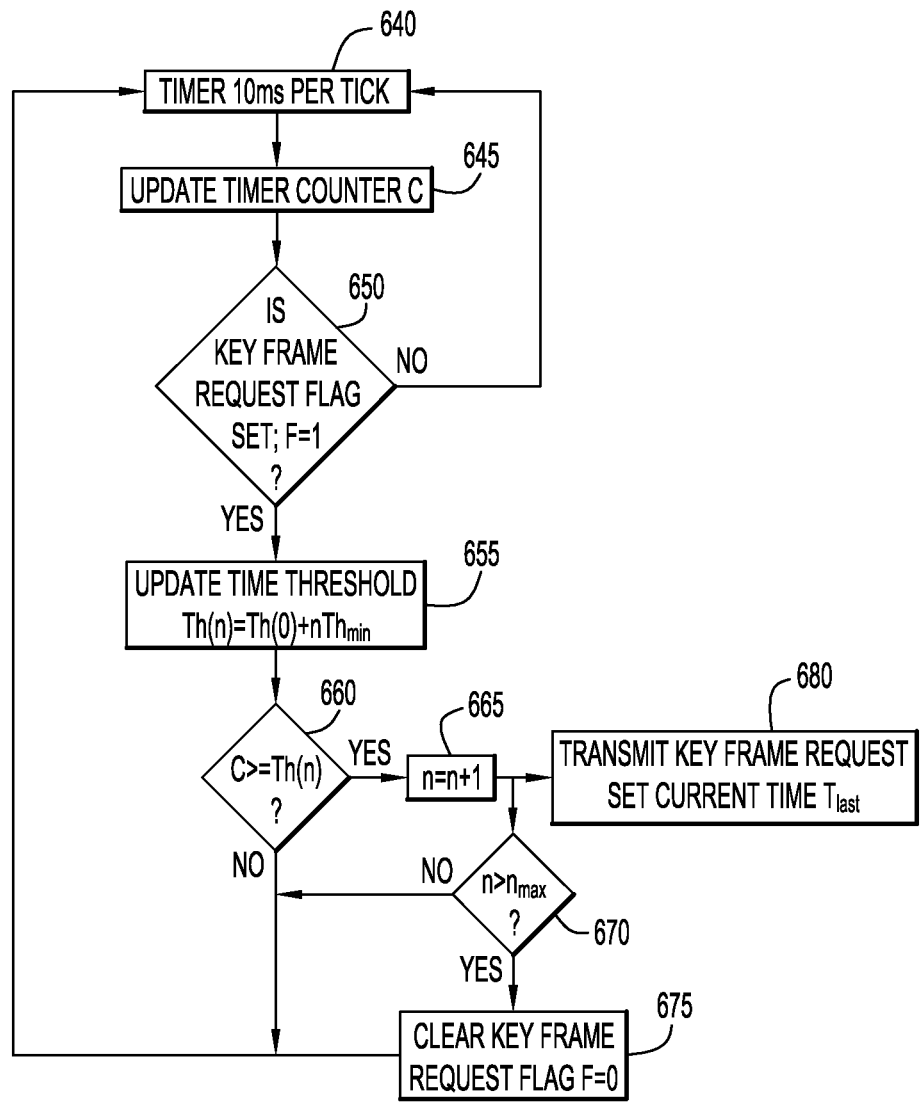

Reference is now made to FIGS. 6A and 6B. FIGS. 6A and 6B show flow charts depicting operations of the key frame request detection and forwarding logic 300 for filtering key frame request received by the video conference bridge 120 from multiple destination endpoint devices 110(2)-110(n) to determine the validity of each received key frame request message. The operations in FIGS. 6A and 6B occur upon receipt of key frame request messages from the multiple endpoint devices 110(2)-110(n), as described above. Specifically, the operations shown in FIG. 6A occur before the operations shown in FIG. 6B. Table 2 comprises definitions are used in connection with the operations described in FIGS. 6A and 6B:

TABLE 2

Definitions used in connection with filtering key frame request received by the from multiple destination endpoint devices

| Variable | Definition |
|---|---|
| $TH_{min}$ | Time threshold (e.g., in units of ten milliseconds) of the minimum interval for making valid key frame requests (default value = two seconds) |
| $n_{max}$ | Maximum number of endpoint devices making key frame requests |
| $T_{cur}$ | The current system time from zero |
| $T_{last}$ | The current system time from when the last key frame request message was made. Initial value = $-TH_{min}$ |

At 605, the key frame request handling module receives a key frame request message from the key frame request filter 215 (as described in connection with FIG. 2, above). Once the key frame request message is received, at 610, the processor 230 sets a key frame request flag (shown by indicator "F" in FIGS. 6A and 6B) to a zero value. In general, the value or state of the key frame request flag indicates whether a valid key frame request has been received. When the key frame request flag has a zero value (i.e., a value representing an "off state"), the received key frame request message is not a valid key frame request message. For example, the received key frame request message may be a redundant or repetitive key frame request message, as described above. When the key frame request flag has a value set to one (i.e., a value representing an "on state"), the received key frame request message is determined to be a valid key frame request message.

After the key frame request flag is set to the off state at 610, the processor 230, at 615, calculates a delta time (shown as "$T_\delta$") by determining the time at which the key frame request message was received (i.e., the "current" time, $T_{cur}$), the time at which the last key frame request message was received (i.e., the "last" time, $T_{last}$) and subtracts the "last" time from the "current" time. If the received key frame message is the first received key frame message, the "last" time is given an initial time value, which may correspond to a negative value of an "initial threshold" time value ($Th_{int}$), as above in FIG. 4.

After calculating the delta time, the processor 230, at 620, compares the delta time to a minimum time threshold ($Th_{min}$), which represents a minimum interval of making key frame requests. For example, the default value for $Th_{min}$ is two seconds, which represents a minimum interval of two seconds for key frame request messages to be received before they are considered "valid" key frame request messages. In other words, in this example, if multiple key frame request messages are received less than two seconds apart from one another, the received key frame request messages are determined not to be valid, as shown by operation 625. On the other hand, if multiple key frame request messages are received more than two seconds apart from one another, the received key frame request messages are determined to be valid, as shown in operation 630. After the key frame request messages are determined to be valid, the processor 230, at 635, sets the key frame request flag to a value of one to represent the on state. The processor 230 also sets a new time threshold Th(0) equal to the current time (represented by $C_o$). Also, the processor 230 sets a counter value "n" equal to zero.

Reference is now made to FIG. 6B. In FIG. 6B, after a key frame request message is received, the processor 230 begins a timer at 640, and updates a session or timer counter "C" at 645. The counter "C" is similar to the session counter described in FIG. 4, above, and is used to indicate timing instances between received key frame request messages. At 650, the processor 230 determines whether the key frame request flag is in an "on" state (i.e., if the key frame request flag is set to one). As stated above, this indicates that the received key frame request message is a valid key frame request message. If the key frame request flag is not in an "on" state (i.e., if the answer to decision 650 is "no"), the processor 230 disregards the key frame request message, and the processor reverts to operation 640.

If the key frame request flag is in an "on" state (i.e., if the answer to decision 650 is "yes"), the processor 230 at 655 updates the time threshold, and at 660, compares the time threshold to the timer counter value. If the time counter value is greater than or equal to the time threshold, the processor 230, at 665, updates the counter "n", and at 670, determines whether the counter "n" is greater than a maximum counter value ($n_{max}$). If so, the processor 230, at 675, clears the key frame request flag (i.e., sets the flag to a zero value), and if not, 230 reverts to operation 640. Regardless of whether the counter n is greater than a maximum counter value $n_{max}$, the processor 230, at 680, transmits the key frame request message to the key frame request message generator unit 225 (described above in FIG. 2), for ultimate transmission to the source endpoint device 110(1). Also at 680, the processor 230 sets the current time to the "last" time $T_{last}$. Thus, the operations shown in FIGS. 6A and 6B allow the processor to evaluate the validity of multiple key frame request messages received from multiple endpoint devices and to send valid key frame request messages to the source endpoint device 110(a).

In summary, a method is provided comprising: at a video conference bridge, receiving a key frame request message from a first endpoint device participating in a video conference, wherein the key frame request message comprises a request for a key frame from a second endpoint device participating in the video conference; when a prior key frame request message is received before the key frame request message, determining a key frame request time value that corresponds to an amount of time between receiving the key frame request message and receiving a prior key frame request message from the first endpoint device; comparing the determined key frame request time value to a threshold time value; generating a key frame request forwarding message when the key frame request time is greater than the threshold time value; and sending the key frame request forwarding message to the second endpoint device to request the key frame from the second endpoint device when the key frame request time is greater than the threshold time value.

In addition, a method is provided comprising: at a video conference bridge, receiving a plurality of key frame request messages from a plurality of first endpoint devices participating in a video conference, wherein each of the plurality of key frame request messages comprises a request for a key frame from a second endpoint device; determining a key frame request time value that corresponds to an amount of time between receiving one of the plurality of key frame request messages and receiving a prior consecutive key frame request messages from any of the plurality of first endpoint devices; comparing the determined key frame request time value to a threshold time value; and generating a key frame request forwarding message when the key frame request time is greater than the threshold time value; and sending the key frame request forwarding message to the second endpoint device to request the key frame associated with the one of the plurality of key frame request messages from the second endpoint device when the key frame request time is greater than the threshold time value.

Furthermore, one or more computer readable media is provided comprising instructions operable to: receive a key frame request message from a first endpoint device participating in a video conference, wherein the key frame request message comprises a request for a key frame from a second endpoint device participating in the video conference; when a prior key frame request message is received before the key frame request message, determine a key frame request time value that corresponds to an amount of time between receiving the key frame request message and receiving a prior key frame request message from the first endpoint device; compare the determined key frame request time value to a threshold time value; generate a key frame request forwarding message when the key frame request time is greater than the threshold time value; and send the key frame request forwarding message to the second endpoint device to request the key frame from the second endpoint device when the key frame request time is greater than the threshold time value.

In addition, one or more computer readable media is provided comprising instructions operable to: receive a plurality of key frame request messages from a plurality of first endpoint devices participating in a video conference, wherein each of the plurality of key frame request messages comprises a request for a key frame from a second endpoint device; determine a key frame request time value that corresponds to an amount of time between receiving one of the plurality of key frame request messages and receive a prior consecutive key frame request messages from any of the plurality of first endpoint devices; compare the determined key frame request time value to a threshold time value; and generate a key frame request forwarding message when the key frame request time is greater than the threshold time value; and send the key frame request forwarding message to the second endpoint device to request the key frame associated with the one of the plurality of key frame request messages from the second endpoint device when the key frame request time is greater than the threshold time value.

Furthermore, an apparatus is provided comprising: a first network interface unit; a second network interface unit; and a processor coupled to the first network interface unit and the second network interface unit, and configured to: receive a key frame request message from a first endpoint device participating in a video conference, wherein the key frame request message comprises a request for a key frame from a second endpoint device participating in the video conference; when a prior key frame request message is received before the key frame request message, determine a key frame request time value that corresponds to an amount of time between receiving the key frame request message and receiving a prior key frame request message from the first endpoint device; compare the determined key frame request time value to a threshold time value; generate a key frame request forwarding message when the key frame request time is greater than the threshold time value; and send the key frame request forwarding message to the second endpoint device to request the key frame from the second device when the key frame request time is greater than the threshold time value.

Additionally, an apparatus is provided comprising: a first network interface unit; a second network interface unit; and a processor coupled to the first network interface unit and the second network interface unit and the memory, and configured to: receive a plurality of key frame request messages from a plurality of first endpoint devices participating in a video conference, wherein each of the plurality of key frame request messages comprises a request for a key frame from a second endpoint device; determine a key frame request time value that corresponds to an amount of time between receiving one of the plurality of key frame request messages and receive a prior consecutive key frame request messages from any of the plurality of first endpoint devices; compare the determined key frame request time value to a threshold time value; and generate a key frame request forwarding message when the key frame request time is greater than the threshold time value; and send the key frame request forwarding message to the second endpoint device to request the key frame associated with the one of the plurality of key frame request messages from the second device when the key frame request time is greater than the threshold time value.

The above description is intended by way of example only.

What is claimed is:

1. A method comprising:
    at a video conference bridge, receiving a key frame request message from a first endpoint device participating in a video conference, wherein the key frame request message comprises a request for a key frame from a second endpoint device participating in the video conference;
    when a prior key frame request message is received before the key frame request message, determining a key frame request time value that corresponds to an amount of time between receiving the key frame request message and receiving a prior key frame request message from the first endpoint device;
    comparing the determined key frame request time value to a threshold time value;
    generating a key frame request forwarding message when the key frame request time is greater than the threshold time value; and
    sending the key frame request forwarding message to the second endpoint device to request the key frame from the second endpoint device when the key frame request time is greater than the threshold time value.

2. The method of claim 1, wherein comparing comprises comparing the key frame request time value to one of a plurality of threshold time values.

3. The method of claim 1, further comprising:
    classifying the received key frame request message as a valid key frame request message when the key frame request time value is greater than the threshold time value; and
    classifying the received key frame request message as a repeat key frame request message when the key frame request time value is less than the threshold time value.

4. The method of claim 3, wherein comparing comprises comparing the key frame request time value to the threshold time value that represents an acceptable time value between receiving the key frame request message and the prior key frame request message to ensure that the received key frame request message is not redundant and does not exceed bandwidth limits of a network supporting the video conference.

5. The method of claim 1, further comprising generating a session counter value associated with the key frame request message, wherein the session counter value is used to determine whether the key frame request message should be sent to the second endpoint device.

6. A method comprising:
    at a video conference bridge, receiving a plurality of key frame request messages from a plurality of first endpoint devices participating in a video conference, wherein each of the plurality of key frame request messages comprises a request for a key frame from a second endpoint device;
    determining a key frame request time value that corresponds to an amount of time between receiving one of the plurality of key frame request messages and receiving a prior consecutive key frame request messages from any of the plurality of first endpoint devices;
    comparing the determined key frame request time value to a threshold time value;
    generating a key frame request forwarding message when the key frame request time is greater than the threshold time value; and
    sending the key frame request forwarding message to the second endpoint device to request the key frame associated with the one of the plurality of key frame request messages from the second endpoint device when the key frame request time is greater than the threshold time value.

7. The method of claim 6, further comprising:
    generating a count value when a first one of the plurality of key frame request messages is received;
    incrementing the count value when additional ones of the plurality of key frame request messages are received after the first one of the plurality of key frame request messages; and
    comparing the count value to a threshold count value representing a maximum number of allowable received key frame messages.

8. The method of claim 7, wherein sending comprises sending one of the plurality of key frame request messages to the second endpoint device when the count value is less than the threshold count value.

9. The method of claim 7, further comprising:
    setting a key frame request flag to a value representing an on state when the determined key frame request time value is greater than or equal to the threshold time value;
    updating the threshold time value based on the count value; and
    setting the key frame request flag to a value representing an off state when the count value is larger than the threshold count value.

10. One or more non-transitory computer readable storage media encoded with software comprising computer executable instructions and when the software is executed operable to:
  receive a key frame request message from a first endpoint device participating in a video conference, wherein the key frame request message comprises a request for a key frame from a second endpoint device participating in the video conference;
  when a prior key frame request message is received before the key frame request message, determine a key frame request time value that corresponds to an amount of time between receiving the key frame request message and receiving a prior key frame request message from the first endpoint device;
  compare the determined key frame request time value to a threshold time value;
  generate a key frame request forwarding message when the key frame request time is greater than the threshold time value; and
  send the key frame request forwarding message to the second endpoint device to request the key frame from the second endpoint device when the key frame request time is greater than the threshold time value.

11. The computer readable storage media of claim 10, wherein the instructions operable to compare the determined key frame request time value comprise instructions operable to compare the key frame request time value to one of a plurality of threshold time values.

12. The computer readable storage media of claim 10, further comprising instructions operable to:
  classify the received key frame request message as a valid key frame request message when the key frame request time value is greater than the threshold time value; and
  classify the received key frame request message as a repeat key frame request message when the key frame request time value is less than the threshold time value.

13. The computer readable storage media of claim 12, wherein the instructions operable to compare the determined key frame request time value comprise instructions operable to compare the key frame request time value to the threshold time value that represents an acceptable time value between receiving the key frame request message and the prior key frame request message to ensure that the received key frame request message is not redundant and does not exceed bandwidth limits of a network that supports the video conference.

14. The computer readable storage media of claim 10, further comprising instructions operable to generate a session counter value associated with the key frame request message, wherein the session counter value is used to determine whether the key frame request message should be sent to the second endpoint device.

15. One or more non-transitory computer readable storage media encoded with software comprising computer executable instructions and when the software is executed operable to:
  receive a plurality of key frame request messages from a plurality of first endpoint devices participating in a video conference, wherein each of the plurality of key frame request messages comprises a request for a key frame from a second endpoint device;
  determine a key frame request time value that corresponds to an amount of time between receiving one of the plurality of key frame request messages and receive a prior consecutive key frame request messages from any of the plurality of first endpoint devices;
  compare the determined key frame request time value to a threshold time value; and
  generate a key frame request forwarding message when the key frame request time is greater than the threshold time value; and
  send the key frame request forwarding message to the second endpoint device to request the key frame associated with the one of the plurality of key frame request messages from the second endpoint device when the key frame request time is greater than the threshold time value.

16. The computer readable storage media of claim 15, further comprising instructions operable to:
  generate a count value when a first one of the plurality of key frame request messages is received;
  increment the count value when additional ones of the plurality of key frame request messages are received after the first one of the plurality of key frame request messages; and
  compare the count value to a threshold count value representing a maximum number of allowable received key frame messages.

17. The computer readable storage media of claim 16, wherein the instructions operable to send the one of the plurality of key frame request messages to the second endpoint device comprise instructions operable to send the one of the plurality of key frame request messages to the second endpoint device when the count value is less than the threshold count value.

18. An apparatus comprising:
  a first network interface unit;
  a second network interface unit; and
  a processor coupled to the first network interface unit and the second network interface unit, and configured to:
    receive a key frame request message from a first endpoint device participating in a video conference, wherein the key frame request message comprises a request for a key frame from a second endpoint device participating in the video conference;
    when a prior key frame request message is received before the key frame request message, determine a key frame request time value that corresponds to an amount of time between receiving the key frame request message and receiving a prior key frame request message from the first endpoint device;
    compare the determined key frame request time value to a threshold time value;
    generate a key frame request forwarding message when the key frame request time is greater than the threshold time value; and
    send the key frame request forwarding message to the second endpoint device to request the key frame from the second endpoint device when the key frame request time is greater than the threshold time value.

19. The apparatus of claim 18, wherein the processor is further configured to compare the determined key frame request time value comprise instructions operable to compare the key frame request time value to one of a plurality of threshold time values.

20. An apparatus comprising:
  a first network interface unit;
  a second network interface unit; and
  a processor coupled to the first network interface unit and the second network interface unit, and configured to:
    receive a plurality of key frame request messages from a plurality of first endpoint devices participating in a video conference, wherein each of the plurality of key frame request messages comprises a request for a key frame from a second endpoint device;

determine a key frame request time value that corresponds to an amount of time between receiving one of the plurality of key frame request messages and receive a prior consecutive key frame request messages from any of the plurality of first endpoint devices;

compare the determined key frame request time value to a threshold time value;

generate a key frame request forwarding message when the key frame request time is greater than the threshold time value; and send the key frame request forwarding message to the second endpoint device to request the key frame associated with the one of the plurality of key frame request messages from the second endpoint device when the key frame request time is greater than the threshold time value.

21. The apparatus of claim 20, wherein the processor is further configured to:

generate a count value when a first one of the plurality of key frame request messages is received;

increment the count value when additional ones of the plurality of key frame request messages are received after the first one of the plurality of key frame request messages; and compare the count value to a threshold count value representing a maximum number of allowable received key frame messages.

* * * * *